US012345182B2

(12) United States Patent
Burkholder

(10) Patent No.: US 12,345,182 B2
(45) Date of Patent: Jul. 1, 2025

(54) PLATE VALVE FOUR STOKE HEAD

(71) Applicant: Steve Burkholder, Annapolis, MD (US)

(72) Inventor: Steve Burkholder, Annapolis, MD (US)

(*) Notice: Subject to any disclaimer, the term of this patent is extended or adjusted under 35 U.S.C. 154(b) by 0 days.

(21) Appl. No.: 17/616,962

(22) PCT Filed: Jun. 3, 2020

(86) PCT No.: PCT/US2020/035877
§ 371 (c)(1),
(2) Date: Dec. 6, 2021

(87) PCT Pub. No.: WO2020/247466
PCT Pub. Date: Dec. 10, 2020

(65) Prior Publication Data
US 2022/0307391 A1 Sep. 29, 2022

Related U.S. Application Data

(60) Provisional application No. 62/856,402, filed on Jun. 3, 2019.

(51) Int. Cl.

| | |
|---|---|
| ***F01L 7/06*** | (2006.01) |
| ***F01L 3/02*** | (2006.01) |
| ***F01L 3/08*** | (2006.01) |
| ***F01M 9/10*** | (2006.01) |
| ***F02F 1/42*** | (2006.01) |

(52) U.S. Cl.
CPC .................. *F01L 7/06* (2013.01); *F01L 3/02* (2013.01); *F01L 3/08* (2013.01); *F01M 9/10* (2013.01); *F02F 1/4285* (2013.01); *F01L 2250/04* (2013.01); *F01L 2301/00* (2020.05)

(58) Field of Classification Search
CPC ....... F01L 7/06; F01L 7/16; F01L 7/14; F01L 2301/00; F01L 2810/02; F01M 9/10; F01M 9/109; F02F 1/4285
See application file for complete search history.

(56) References Cited

U.S. PATENT DOCUMENTS 4,418,658 A 12/1983 DiRoss
4,550,696 A * 11/1985 Ehrlich .............. F01L 1/34403 123/73 D (Continued)

FOREIGN PATENT DOCUMENTS

CN 105927306 A * 9/2016 ................ F01L 7/06
DE 1121405 B 1/1962

(Continued)

OTHER PUBLICATIONS

Japanese Office Action issued in Japanese Patent Application No. 2021-571917 dated Feb. 28, 2023.

(Continued)

*Primary Examiner* — Grant Moubry
(74) *Attorney, Agent, or Firm* — Dickinson Wright PLLC

(57) ABSTRACT

A head, for an internal combustion engine, is provided, the head using at least one plate to control the filling and emptying of the combustion chamber. The plate may be placed so that the movement of the plate may open or close the intake and/or exhaust ports. The timing of the opening and closing of the port can be controlled by a partial cutout in the plate.

22 Claims, 10 Drawing Sheets

(56) References Cited

U.S. PATENT DOCUMENTS

| | | | | | |
|---|---|---|---|---|---|
| 4,838,220 | A * | 6/1989 | Parsons | F01L 7/08 123/190.14 |
| 5,040,498 | A * | 8/1991 | Scherer | F01L 7/06 123/81 D |
| 5,558,049 | A * | 9/1996 | Dubose | F01L 7/028 123/80 D |
| 5,713,314 | A * | 2/1998 | Beare | F01L 3/205 123/51 R |
| 2008/0041325 | A1* | 2/2008 | Agapiades | F01L 7/16 123/90.22 |
| 2010/0006054 | A1 | 1/2010 | Jolley, Jr. | |
| 2014/0238358 | A1* | 8/2014 | Arens | F02B 33/30 123/495 |

FOREIGN PATENT DOCUMENTS

| | | | | |
|---|---|---|---|---|
| DE | 10323594 | A1 | 12/2004 | |
| EP | 1983163 | A1 * | 10/2008 | F01L 5/02 |
| JP | H01-080709 | | 3/1989 | |
| JP | H08-232620 | A | 9/1996 | |
| KR | 1020110037201 | A * | 4/2011 | F01L 7/06 |
| WO | WO-9954600 | A1 * | 10/1999 | F01L 7/06 |
| WO | 2011129799 | A1 | 10/2011 | |

OTHER PUBLICATIONS

Japanese Office Action issued in Japanese Patent Application No. 2021-571917 dated May 16, 2023.

Australian Office Action dated Mar. 23, 2022.

Second Preliminary Decision received by Australian Patent Office dated Jul. 19, 2024.

* cited by examiner

PLATE VALVE FOUR STOKE HEAD

CROSS-REFERENCE TO RELATED APPLICATION

This Application is a National Stage Application, filed under 35 USC § 371 of International Application PCT/US20/35877, filed Jun. 3, 2020 in the United States Patent and Trademark Office, which International Application claims the benefit of U.S. Provisional Patent Application 62/856,402, filed in the United States Patent and Trademark Office on Jun. 3, 2019, the disclosures of which are incorporated herein by reference in their entireties.

BACKGROUND

1. Field

Apparatuses and methods consistent with example embodiments relate to a head, for an internal combustion engine, using at least one plate to control the filling and emptying of the combustion chamber.

2. Description of the Related Art

Four stroke internal combustion engines almost exclusively use poppet type, intake and exhaust, valves to fill and empty the combustion chamber. The timing of the opening and closing of the valves is normally controlled by a cam. The cam opens and closes the valves relative to the stroke/crank location.

While the use of a poppet valve is nearly universal in four stroke engines, there are several design limitations of this arrangement. The complexity of the valve train has long been a design challenge, and a poppet valve is a reciprocating part which must be controlled very precisely for the engine to perform properly and reliably.

The poppet valve itself it has been proven a very reliable design. However, as the rotations per minute (rpms) of engines increase, the total weight of reciprocating parts, including pieces of the valve train, become crucial. Loads increase with higher engine speeds, reducing reliability. This creates a need for lighter stronger materials, which increases costs.

A typical poppet valve is held closed by a spring, and it is pushed open by one of several methods depending on the engine design. Ultimately a cam is used to push the valve open and the spring must be strong enough to overcome the inertia of the valve and reciprocating pieces of the valve train, travelling in the opening direction, and follow the cam profile as it allows the valve to close. However, as engine speeds increase, the inertia increases and stronger springs are needed. This puts greater loads on the valves and the other components in the valve train necessitating heavier components to handle the loads. The energy used to overcome these increased loads reduces the usable power output from the engine.

SUMMARY

Example embodiments may address at least the above problems and/or disadvantages and other disadvantages not described above. Also, example embodiments are not required to overcome the disadvantages described above, and may not overcome any of the problems described above.

One or more example embodiments may provide an engine head, comprising: an attachment portion configured to be attached to an end of a cylinder, such that a combustion chamber is defined by walls of the cylinder and the attachment portion; an intake port extending from a first end in communication with the combustion chamber and a second end, opposite the combustion chamber; an exhaust port extending from a first end in communication with the combustion chamber and a second end, opposite the combustion chamber; a first plate comprising a solid portion and at least one opening, wherein the first plate is moveable between a first position in which the solid portion of the first plate closes the intake port between the first end of the intake port and the second end of the intake port, and a second position in which the opening in the first plate allows passage of gas between the first end of the intake port and the second end of the intake port; and a second plate comprising a solid portion and at least one opening, wherein the second plate is moveable between a first position in which the solid portion of the second plate closes the exhaust port between the first end of the exhaust port and the second end of the exhaust port, and a second position in which the opening in the second plate allows passage of gas between the first end of the exhaust port and the second end of the exhaust port.

BRIEF DESCRIPTION OF THE DRAWINGS

The above and/or other aspects and advantages will become apparent and more readily appreciated from the following description of example embodiments, taken in conjunction with the accompanying drawings in which.

DETAILED DESCRIPTION

Figure 1A:
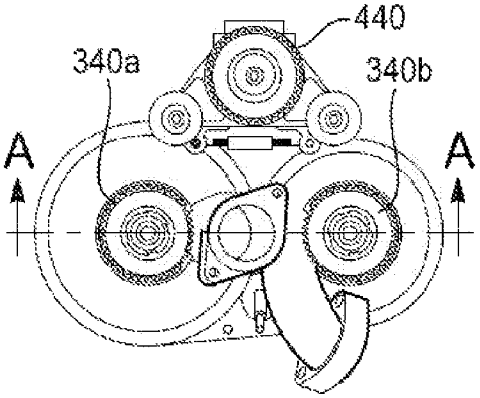
FIGS. 1A and 1B are a top view and a cross-sectional view of an engine according to an example embodiment.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms “include,” “including”, “comprise,” and/or “comprising.” when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as 'at least one of,' when preceding a list of elements, modify the entire list of elements and do not modify the individual elements of the list. In addition, the terms such as "unit," "-er (-or)," and "module" described in the specification refer to an element for performing at least one function or operation, and may be implemented in hardware, software, or the combination of hardware and software.

Various terms are used to refer to particular system components. Different companies may refer to a component by different names—this document does not intend to distinguish between components that differ in name but not function.

Matters of these example embodiments that are obvious to those of ordinary skill in the technical field to which these example embodiments pertain may not be described here in detail.

Figure 1B:
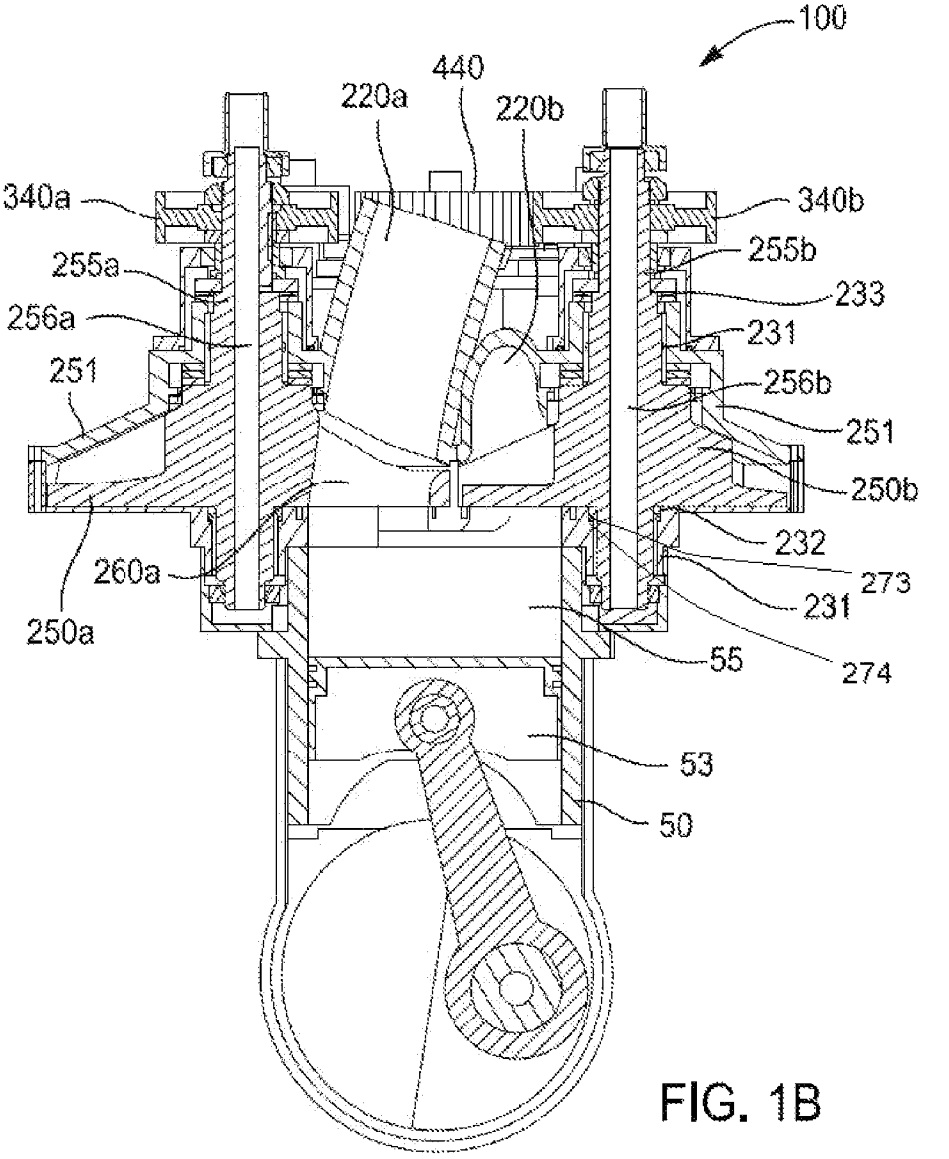

One or more example embodiments provide a head for an internal combustion four-stroke engine using at least one reciprocating piston in a cylinder bore. FIGS. 1A and 1B illustrate an engine 100 according to an example embodiment. FIG. 1A is a top view of the engine 100, and FIG. 1B illustrates a cross-section of the engine 100 taken along line A-A of FIG. 1A. The head 200 is mounted so that it covers the end of the cylinder 50 creating a combustion chamber 55 between the piston 53 and the head 200. Part of the head 200 is in communication with the combustion chamber 55 and may take any shape to achieve a desired combustion chamber shape and/or desired compression ratio. Bolts and/or studs with nuts may be used to mount the head 200 and to achieve a seal between the cylinder 50 and the head 200. Machined surfaces may be used to achieve the seal between the cylinder 50 and the head 200. However, this means should not be considered to be limiting, and a gasket, o-ring, or any other means may be used to achieve the seal, as would be understood by one of skill in the art. Alternatively the cylinder 50 and head 200 could be one piece.

Contained within the head 200 are at least two ports: an intake port 220*a* and an exhaust port 220*b*. Both the intake and exhaust ports 220*a* and 220*b* are in communication with the combustion chamber 55 at one end and with atmosphere at an opposite end.

Figure 2A:
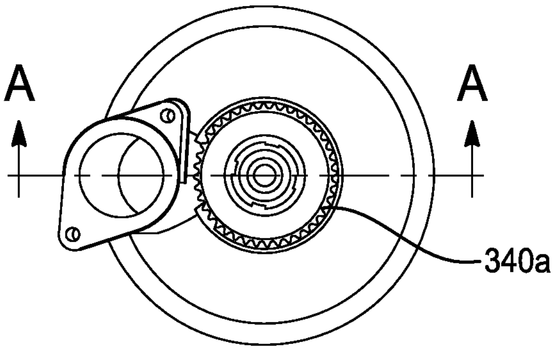
FIGS. 2A, 2B, and 2C are atop view, across-sectional view, and a perspective view, respectively, of an intake rotor system according to an example embodiment.
Figure 2B:
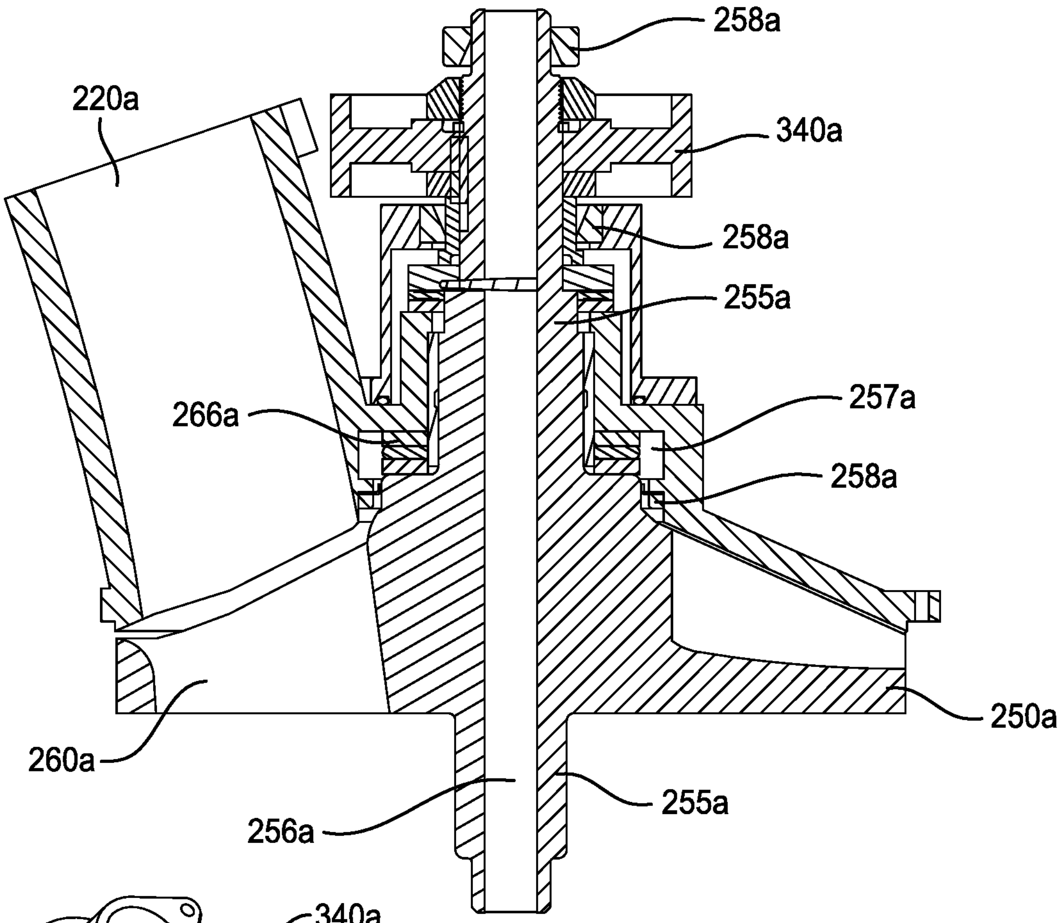
Figure 2C:
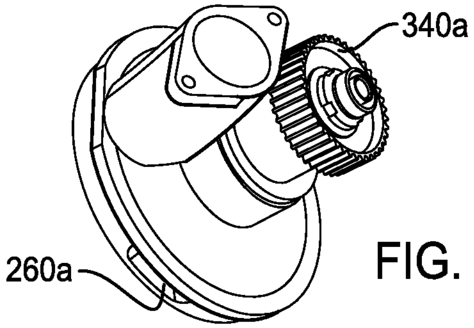

FIGS. 2A, 2B, and 2C illustrate an intake rotor system according to an example embodiment. FIG. 2A is a top view of the intake rotor system, and FIG. 2B illustrates a cross-section of the intake rotor system, taken along line A-A in FIG. 2A. FIG. 2C is a perspective view of the intake rotor system. At least one port in the head 200 is an intake port 220*a* used to fill the combustion chamber 55 with air for combustion in the engine. An intake system (not shown) is in communication with the atmosphere at one end and in communication with the intake port 220*a* at the other end, and the intake system may contain an air filtering system, a carburetor, or a fuel injection throttle body, turbo charger, blower, and an intake manifold, for example. Fuel injectors may be used to add fuel for combustion and may be included within the intake system or may inject directly into the combustion chamber 55. This list is not to be considered all-inclusive of intake system configurations and possible methods used for achieving a desired fuel/air mixture in the combustion chamber 55, and the example embodiments are not limited to those listed here.

Figure 3A:
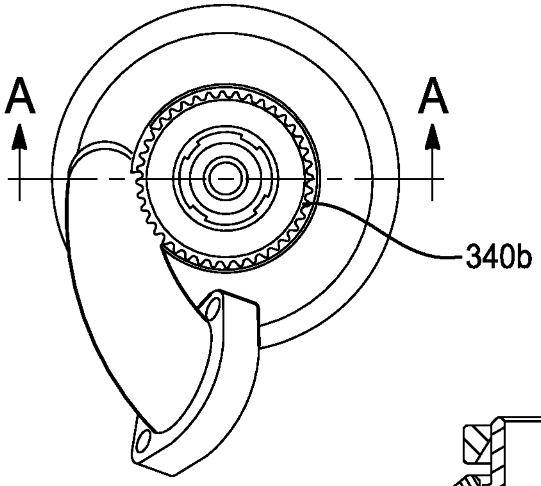
FIGS. 3A, 3B, and 3C are atop view, across-sectional view, and a perspective view, respectively, of an exhaust rotor system according to an example embodiment.
Figure 3B:
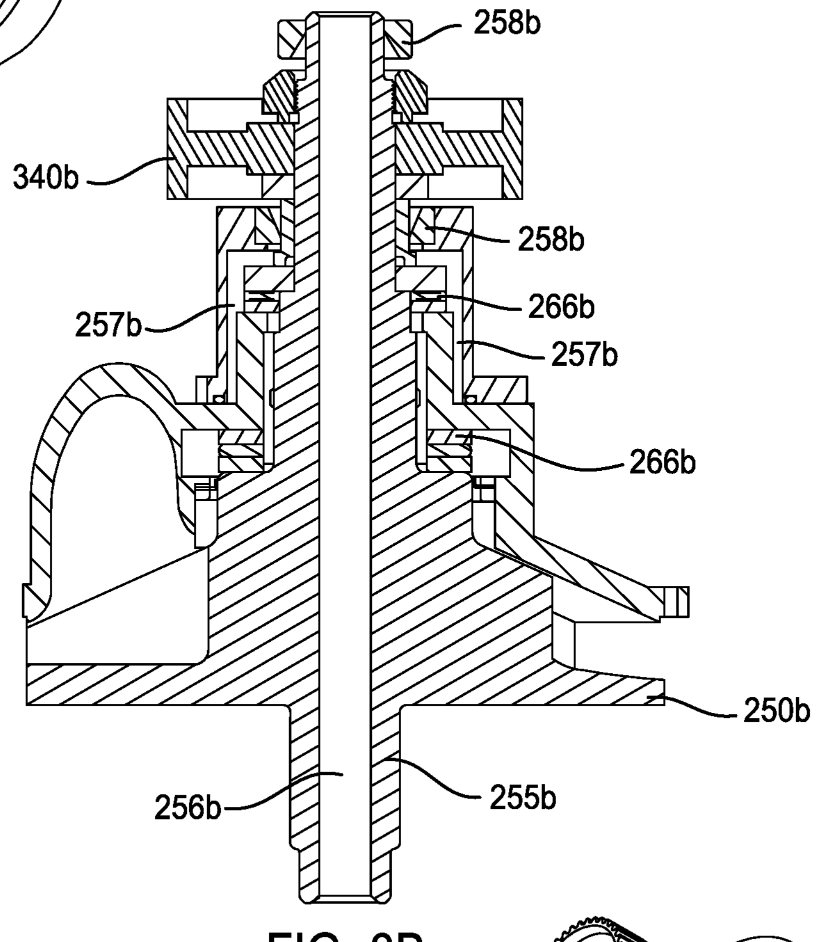
Figure 3C:
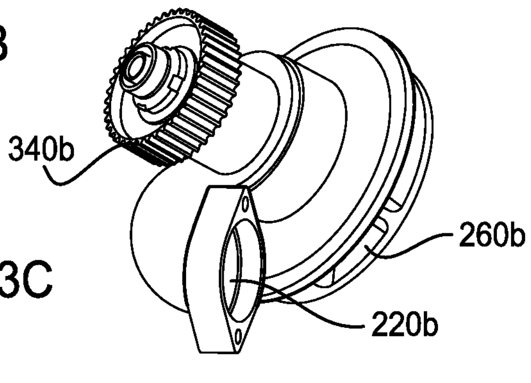

FIGS. 3A, 3B, and 3C illustrate an exhaust rotor system according to an example embodiment. FIG. 3A is a top view of the exhaust rotor system, and FIG. 3B illustrates a cross-section of the exhaust rotor system, taken along line A-A in FIG. 3A. FIG. 3C is a perspective view of the exhaust rotor system. At least one port in the head 200 is an exhaust port 220*b* used to remove burnt gases from the combustion chamber 55. An exhaust system (not shown) may be in communication with the exhaust port 220*b* on one end, and used to direct the gases away from the engine/exhaust port. At an opposite end, the exhaust system may be in communication with the atmosphere. An exhaust system may contain emission control components and/or sound control components. One of skill in the art would understand that this description of exhaust system configurations is merely an example and is not limiting.

With reference to FIGS. 1A, 1B, 2A-2C, and 3A-3C, in conjunction with each port 220*a*/220*b*, a plate 250*a*/250*b* is disposed such that it intersects the corresponding port at an angle approximately perpendicular to the flow of gas through the port 220*a*/220*b* at the intersection point. The plate 250*a*/250*b* is designed so that it can be moved so that the corresponding port 220*a*/220*b* can be opened, allowing communication between the combustion chamber 55 and atmosphere, or closed, sealing the combustion chamber 55 from the atmosphere. The plate 250*a*/250*b* may have a substantially flat portion and may be rotatable on an axis, as shown in FIGS. 1A, 1B, 2A-2C, and 3A-3C, for example, or it may slide and reciprocate (see FIGS. 4, 5A, 5B, 6A, and 6B), or rotate and reciprocate. The plate 220*a*/220*b* does not have to be flat and may be curved to increase its strength and rigidity. The thickness and shape of the plate 250*a*/250*b* are not limited to these descriptions, and any thickness and/or shape that achieves the opening and closing of the port 220*a*/220*b* may be used.

The plate 250*a*/250*b* may be made of aluminum and coated with a hard surface plating such as Nikasil®, which is a plating of nickel and silicon carbide plating. Alternately, the plate 250*a*/250*b* may be made from one or more of a variety of other metals, carbon fiber, other composite materials, or other material, combination of materials, and/or surface treatment, as would be understood by one of skill in the art.

The plate 250*a*/250*b* may rotate on a shaft 255*a*/255*b* that is approximately parallel to the port 220*a*/220*b* at the point of intersection between the port 220*a*/220*b* and the plate 250*a*/250*b*. The shaft 255*a*/255*b* and the plate 250*a*/250*b* together may be one, single piece, or the plate 250*a*/250*b* may be fastened to the shaft 255*a*/255*b*. Any method of construction may be used to build the plate 250*a*/250*b* so that it has a shaft 255*a*/255*b* on which it can rotate. An opening 260*a*/260*b* in the plate may allow the port 220*a*/220*b* to open when the plate 250*a*/250*b* is rotated and the opening 260*a*/260*b* aligns with the port 220*a*/220*b*.

Bearings 266*a*/266*b* may be used to support the plate shaft 255*a*/255*b* and reduce friction and wear as the plate 250*a*/250*b* rotates, and may be radial and/or thrust bearings. The bearings may be ball bearings, roller bearings, bronze bearings, or any other type of bearing, as would be understood by one of skill in the art.

Oil, provided in an oil passage 257*a*/257*b*, as shown in FIGS. 2B and 3B, may be used to reduce wear in the bearings 256*a*/256*b* and to aid in the cooling of the plate 250*a*/250*b*.

Seals 258*a*/258*b*, and 231 may be used to keep oil in areas designed to be exposed to oil, and out of the ports 220*a*/220*b* and/or combustion chamber 55.

Figure 4:
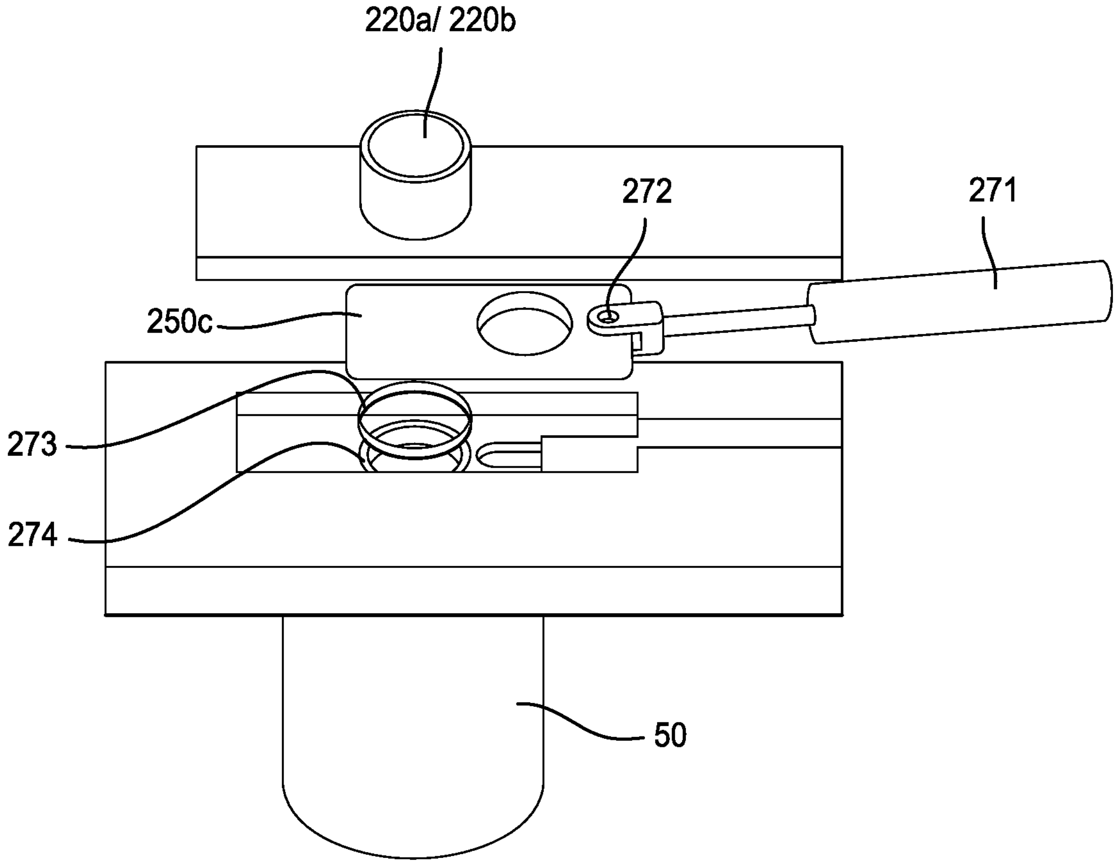
FIG. 4 is an exploded view of a plate system according to an example embodiment.
Figure 5A:
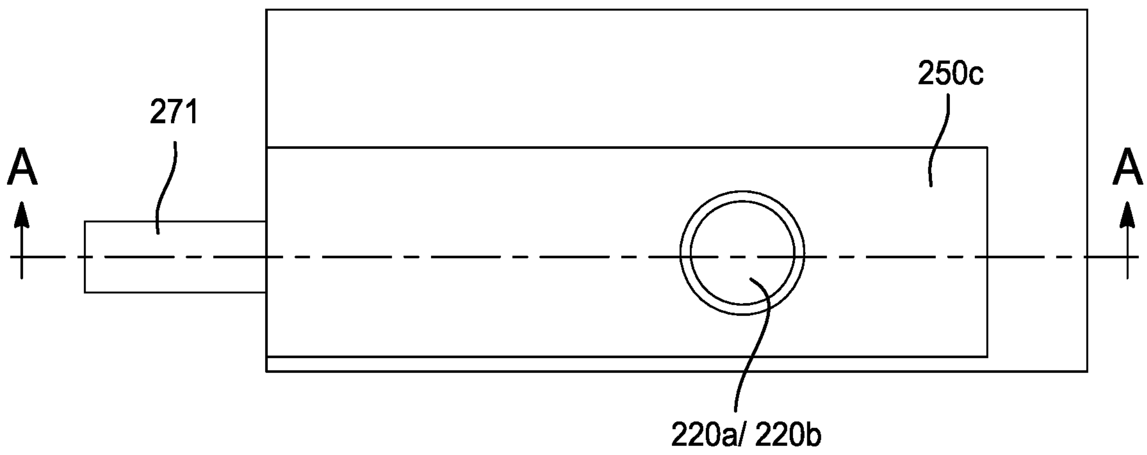
FIGS. 5A and 5B are atop view and across-sectional view of the plate system of FIG. 4 in an open position.
Figure 5B:
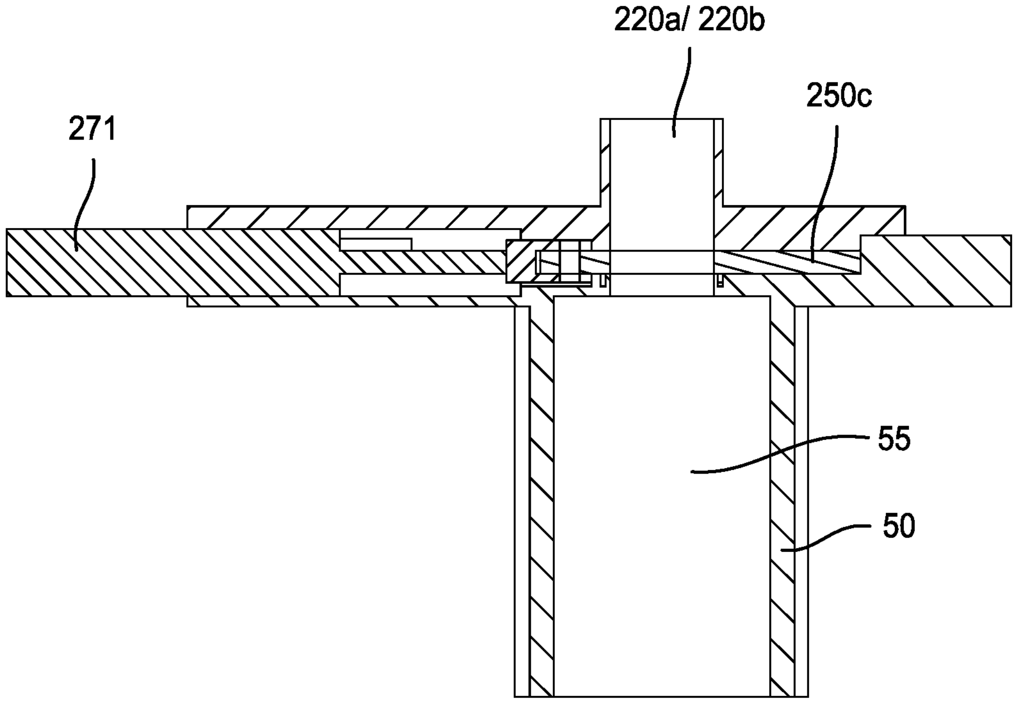
Figure 6A:
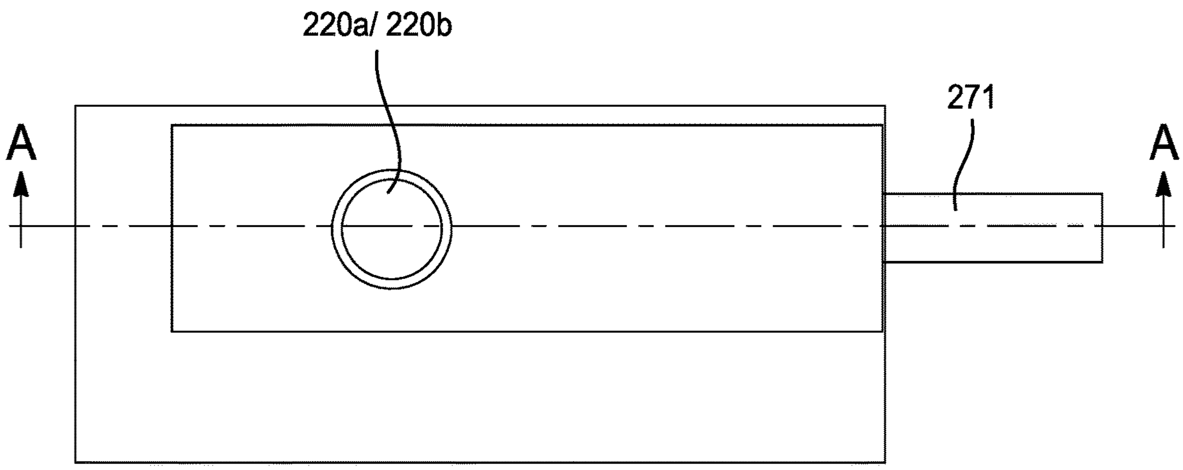
FIGS. 6A and 6B are atop view and across-sectional view of the plate system of FIG. 4 in a closed position.
Figure 6B:
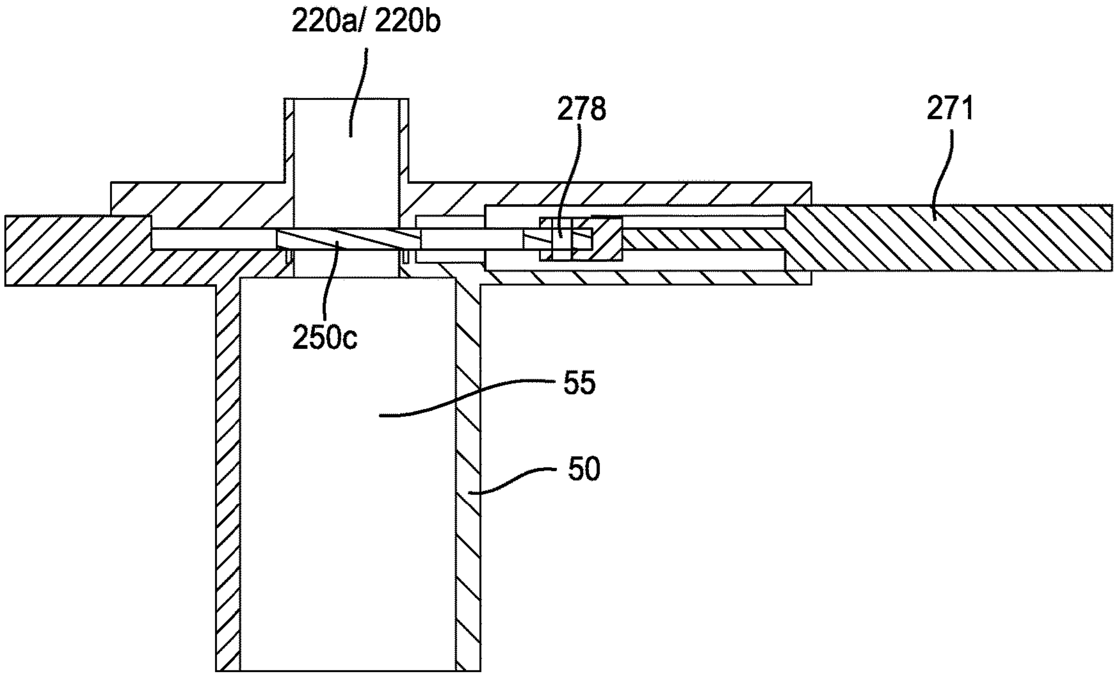

FIG. 4 illustrates an exploded view of an alternative embodiment of a plate system including a plate 250*c* which is slidable in a linear direction, according to an example embodiment. FIG. 5A illustrates a top view of the plate system of FIG. 4 in an open position, and FIG. 5B illustrates a cross-section of the plate system of FIG. 5A, taken along line C-C. FIG. 6A illustrates a top view of the plate system of FIG. 4 in a closed position, and FIG. 6B illustrates a cross-section of the plate system of FIG. 6A, taken along line A-A. As shown, the plate 250*c* may move in a linear motion, acting as a guillotine to thereby open and close the corresponding port 220*a*/220*b*. An actuator 271 may be attached to the plate 250*c*, as by a pin 272, for example, as shown in FIG. 4, in order to control the sliding motion of the plate 250*c*. Alternately, the plate 250*c* may move in a reciprocating rotational movement.

A sealing device may provide a seal between the plate 250*c*, where it is exposed to the port 220*a*/220*b* on the combustion chamber side of the plate 250*c*, and the head surrounding the port, when the port is closed. The sealing device may effectively seal the combustion chamber 55 within the cylinder 50 from the port 220*a*/220*b* at the appropriate time during the compression and power stroke. As shown in FIG. 4, the sealing device may comprise a compression ring 273 that surrounds the intake or exhaust port 220*a*/220*b* in the head. The head may have a ring groove 274 that surrounds the port 220*a*/220*b*. The ring groove may optionally include a pin (not shown) that locates the ring 273 and prevents the ring 273 from rotating in the groove 274. The ring 273 may be a continuous ring that fits accurately in the ring groove 274. The ring 273 may be a split ring that allows any pressure that leaks into the ring groove 274, from the combustion chamber 55, to press the ring 273 outward to provide a seal on the side of the ring groove 274. A wavy spring (not shown) may be used between the bottom of the ring groove 274 and the bottom of the ring 273. The spring may thereby apply pressure against the ring 273, causing the ring 273 to stay in contact with the plate 250*c*, and may maintain pressure between the sealing surface of the ring 273 and the plate 250*c*, as the plate 250*c* moves across the sealing surface of the ring 273. The combustion pressure that pushes the ring 273 against the side of the ring groove 274 may also push the ring 273 against the plate 250*c* to assist the seal between the plate 250*c* and the ring 273.

Multiple rings may be used to achieve a seal at each port. The rings may be round and each fit into a round ring groove. However, the shape of the ring(s) and groove(s) may be any shape to allow for differently-shaped ports. The material used for construction of the ring may be cast iron, carbon, graphite, steel, alloy, or any of a variety of other materials appropriate for use in piston compression rings, as would be understood by one of skill in the art.

Returning to the example embodiment of FIGS. 1A, 1B, 2A-2C, and 3A-3C, including the rotating plates 250*a*/250*b*, according to an example embodiment, the rotating motion of the engine crankshaft may be used to drive the plates 250*a*/250*b* and time the opening and closing of the ports 220*a*/220*b*.

Figure 7A:
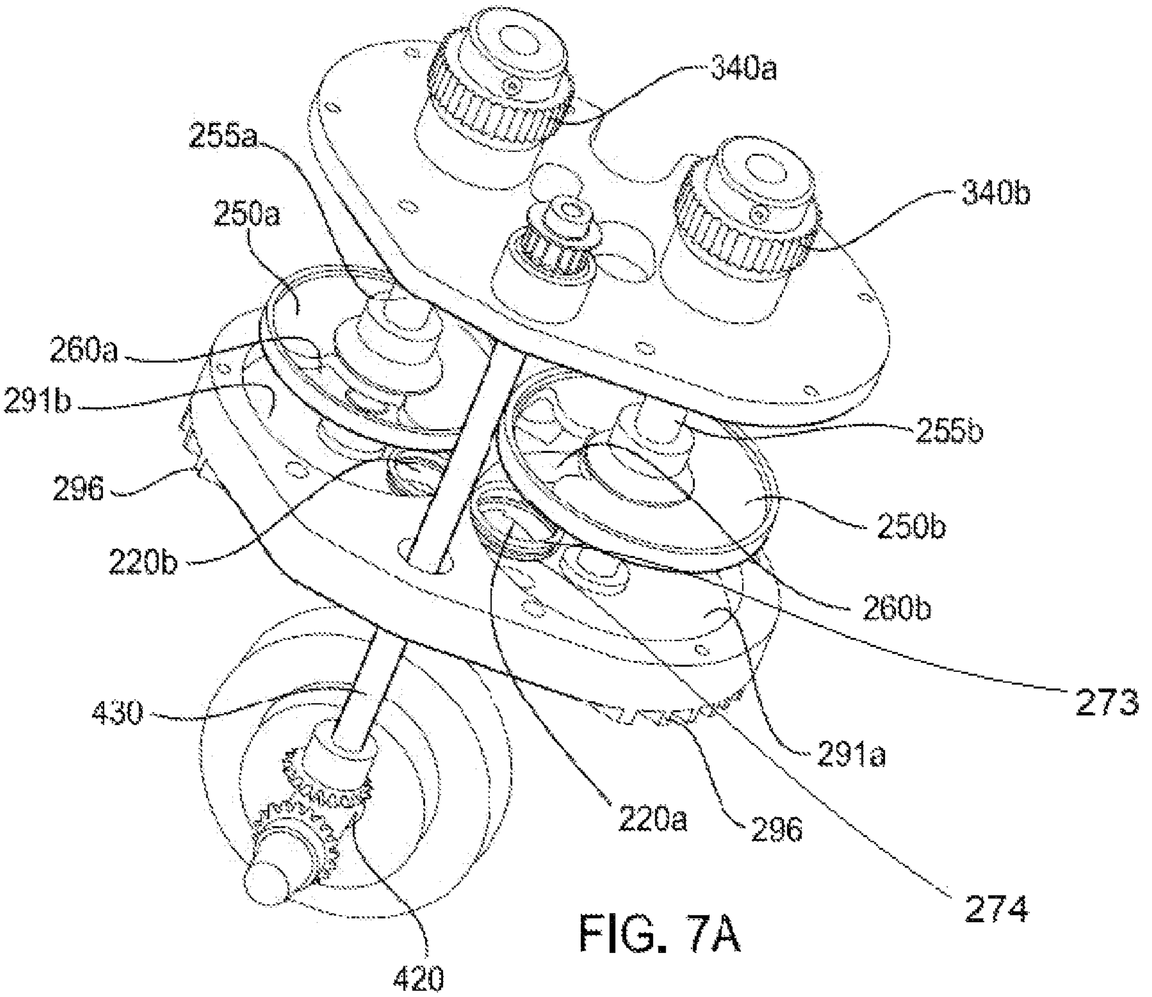
FIG. 7A is an assembly configured to drive plates according to an example embodiment.

FIG. 7A illustrates an example embodiment of an assembly in which the crankshaft is used to drive the plates. Gears 420, one or more shafts 430, and/or one or more belts (not shown) and pulleys 440, 340*a*, and 340*b*, and/or chain and sprockets (not shown), may be used to redirect the rotating motion of the crankshaft to rotate the plates 250*a*/250*b* on their axes. It should be understood that the source of driving and timing the plates 250*a*/250*b* is not limited to the crank shaft and another method may be used to control the plates' movement and timing. One non-limiting example of another method may be an electromagnetic actuator to control the plate movement and timing. The plates 220*a* and 220*b* may rotate at half of the crankshaft speed to allow a single cutout 260*a*/260*b* in each plate to open the corresponding port 220*a*/220*b* every other rotation of the crank.

Figure 7B:
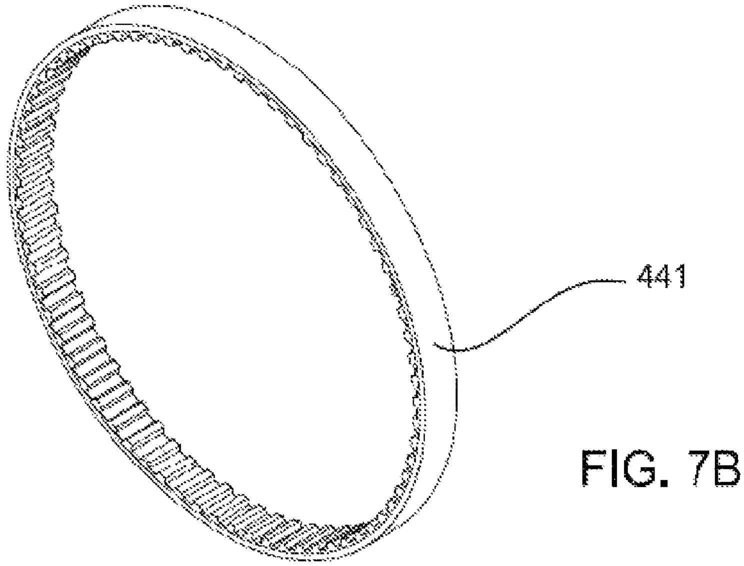
FIG. 7B is a timing belt according to the example embodiment of FIG. 7A.

FIG. 7B illustrates a toothed timing belt. According to an example embodiment, the timing belt 441 is disposed around pulleys 440, 340*a*, and 340*b*, and accordingly, pulleys 340*a* and 340*b* may be used to drive the rotating plates 250*a*/250*b*. The duration of the intake or exhaust event may be controlled by the dimensions of the opening 260*a*/260*b* in the plate 250*a*/250*b*. However, one advantage of belt driven plates is that a single or series of belt tensioners (see FIGS. 9A-9C) may be used between the drive and driven pulleys, and/or between the driven pulleys. This movement, whether individually or together, can advance or retard the centerline of the opening 260*a*/260*b* in the plate 250*a*/250*b* in relation to the crank location. The movement of the tensioners may be controlled electronically using an actuator 451 (FIG. 9C) or mechanically, and may be controlled during operation of the engine to enable the optimum valve timing for a given rpm, load, or efficiency. The tensioners may comprise a bearing that rotates on an axle that is movable and the bearing may directly or indirectly contact the belt 441. The pulleys 340*a* and 340*b* may be pinned to the plate shafts 255*a* and 255*b*, respectively, and may use multiple locations to provide incremental adjustment. Alternately, a splined shaft and pulley (not shown) may be used to allow adjustment. Mounting screws in a slot may also be used to allow rotational adjustment between the pulley 340*a*/340*b* and the plate 250*a*/250*b*. It should be understood that any method may be used to mount the pulleys to the plate shafts and allow incremental rotational adjustment thereamong.

High combustion chamber pressures during the power stroke may cause extreme pressure on the portion of the plate 250*a*/250*b* in communication with the combustion chamber 55. The pressure may cause the plate 220*a*/220*b* to deflect away from the head 200 and sealing device, e.g. rings 273 and ring grooves 274. A scaling device may be used to effectively seal an area between the side of the plate 220*a*/220*b*, opposite the side in communication with the combustion chamber 55, and a valve cover enclosing the plate 220*a*/220*b*. A passage may be in communication with the combustion chamber on one end and the effectively-sealed area on the opposite side of the plate 250*a*/250*b*. The side load on the plate 250*a*/250*b* may thereby be reduced because as the pressure in the combustion chamber 55 increases the passage allows the pressure to equalize in the sealed areas on opposite sides of the plate 250*a*/250*b*.

Alternately, a bearing may be placed so that it supports the plate 250*a*/250*b*, in the area of the port 220*a*/220*b*, against the pressure in the combustion chamber 55. This may be a ball or roller bearing, a Teflon bearing surface, or any other design or material that may come in contact with the plate 250*a*/250*b* to stop or limit deflection of the plate 250*a*/250*b* due to pressure in the combustion chamber 55.

As shown in FIG. 7, the head 200 may have counterbores 291*a* and 291*b* or an area that receives each plate 250*a*/250*b* and allows rotation of the plates. A port 220*a*/220*b* within the counterbore 291*a*/291*b* is closed when the plate 250*a*/250*b* is disposed within the counterbore 291*a*/291*b* and rotated so that the opening 260*a*/260*b* is not aligned with the port 220*a*/220*b*. A shaft 255*a*/255*b* may be located in a central area of, and perpendicular to the counterbore 291*a*/291*b* and be used as an axle for the plate 250*a*/250*b* to rotate on. Alternately, a bearing may be included in a central area of the counterbore 291*a*/291*b*, and a shaft 255*a*/255*b* of the plate 250*a*/250*b* may rotate on the bearing.

The shaft 255*a*/255*b* of the plate 250*a*/250*b* may be substantially perpendicular to a flat sealing face of the plate 250*a*/250*b*. A sealing face of the plate 250*a*/250*b* may be plated with a hard surfacing material. The plating may be Nikasil® or another material. The plate 250*a*/250*b* may rotate in a counterbore 291*a*/291*b*, in the head 200, with the sealing surface facing the head 200.

The shaft 255*a*/255*b* may extend beyond the scaling surface and may have a bearing area that rotates within an axial bearing 231 in a base of a counterbore 291*a*/291*b*. An oil supply passage may supply oil under pressure to a bearing. A seal 232 may be placed on either side of a bearing to contain oil within dedicated oil passages. The seal may be Teflon or another suitable material to endure the heat. The seal may be, but is not limited to, a Viton lip seal.

The plate 250*a*/250*b* may have a stiffening structure on a side of the plate opposite the scaling surface. A thrust roller bearing 233 (see FIG. 1B) may be used to bear upward forces of cylinder combustion against the rotating plate 250*a*/250*b*. The shaft 255*a*/255*b* may extend away from the sealing surface and may have a bearing area that rotates within an axial bearing.

A thrust plate may be fastened to the rotor shaft, above a rotor cover, to provide a bearing surface for a roller thrust bearing, to bear any thrust load in a direction toward the head.

A seal may be disposed on either side of a bearing, or combination of bearings, to contain oil within dedicated oil passages. Such a seal may be Teflon or another material, and may be, for example, a Viton lip seal. A seal may contact a rotor shaft directly or may contact a sleeve placed on a rotor shaft. An o-ring may be used to seal between a sleeve and a rotor shaft.

The head 200 may include one or more sparkplugs (not shown) therein, such that the sparking electrode communicates with the combustion chamber 55 to ignite the air/fuel mixture to begin the power stroke.

The head 200 may have cooling fins 296 about the exterior surface. The heat generated in the combustion chamber 55 may be conducted through the material of the head 200 and dissipated through fins 296 that are cooled by air flowing over them. Alternately, there may be passages (not shown), in and/or around the head and/or a valve cover, containing a liquid coolant that circulates within a radiator/cooling system. The plate 250*a*/250*b* may contain a passage 256 in a shaft 255 allowing a liquid coolant to be in contact with the plate 250*a*/250*b*. Alternately, a fan or another method as would be understood by one of skill in the art may be used to cool the head 200.

The head 200 may be made of aluminum and cast or may be machined from solid stock. However, this description of aluminum is not limiting, and any material, construction, or manufacturing process appropriate for a four stroke head may be used.

A rotor cover 251, as shown in FIG. 1B, may be used to enclose the plates 250*a*/250*b* and may create a continuation of the ports 220*a*/220*b* in the head 200 on the non combustion chamber side of the plates 250*a*/250*b*, and create an area via which the exhaust or intake systems may be connected to the appropriate port 220*a*/220*b*. The rotor cover 251 may include one or more bearings to maintain alignment of the shafts 255*a* and 255*b*, and may include seals containing lubricating oil that may lubricate the bearing(s).

The rotor cover 251 may include cooling fins (not shown) about an exterior surface thereof. The heat generated in the combustion chamber 55 may be conducted through the material of the head 200 and valve cover and dissipated through the cooling fins that are cooled by air flowing over them. Alternately, there may be passages, in and/or around the head 200 and/or rotor cover, and may be in communication with a radiator/cooling system (not shown) that may contain a liquid coolant that circulates within the radiator/cooling system. Alternately, a fan or another method as would be understood by one of skill in the art may be used to cool the rotor cover.

Figure 8A:
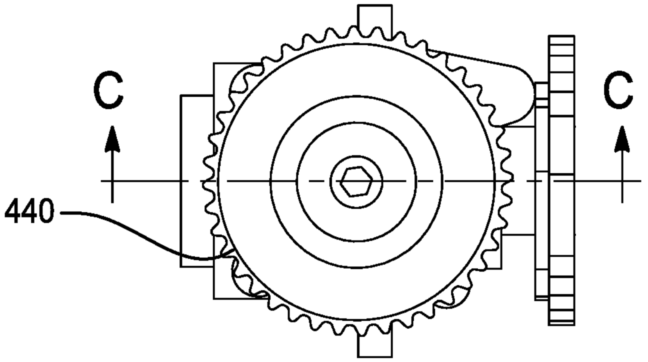
FIGS. 8A, 8B, and 8C are a top view, a cross-sectional view, and a perspective view of a gear case according to an example embodiment.
Figure 8B:
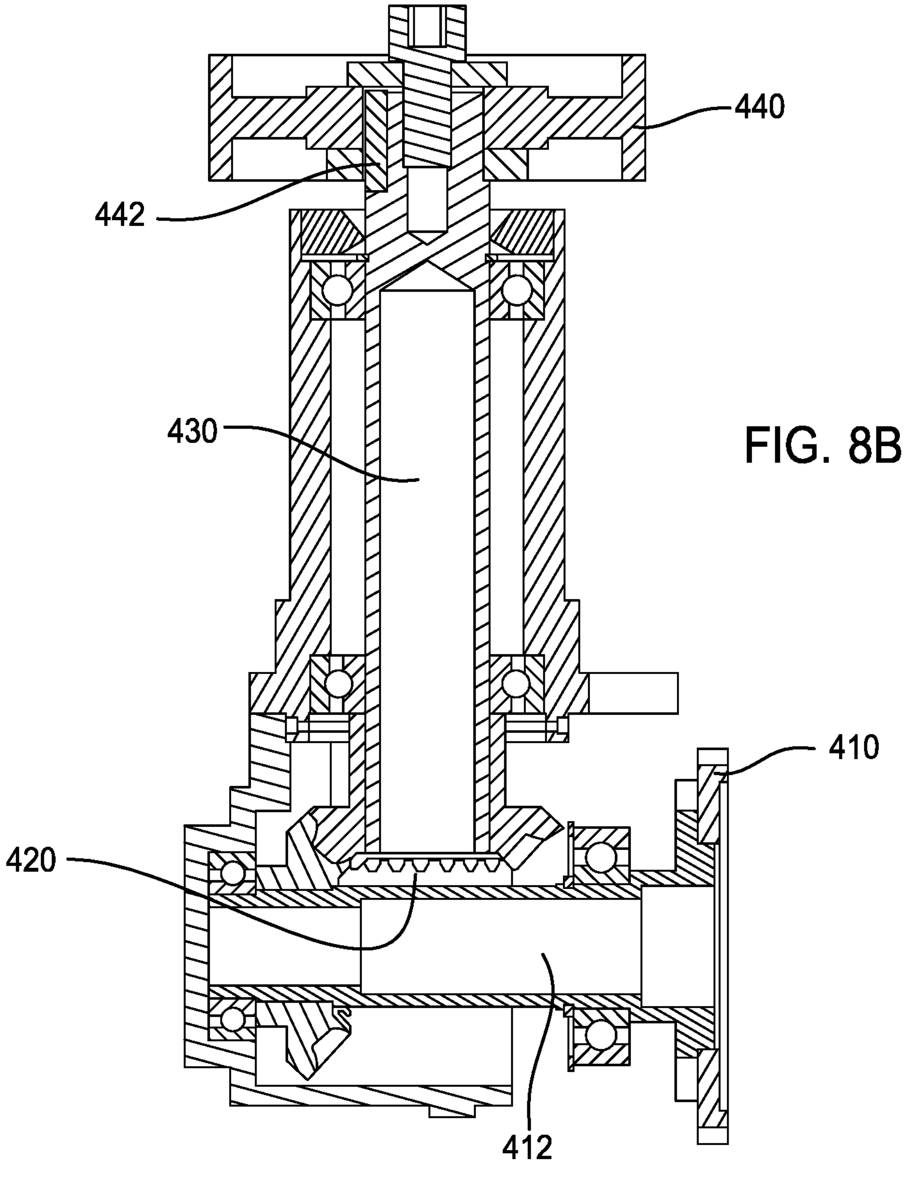
Figure 8C:
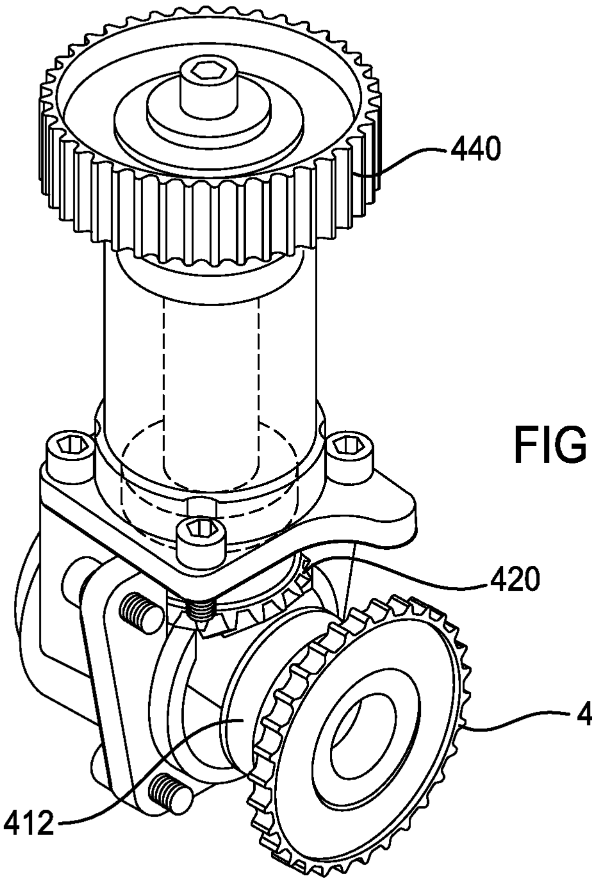

According to an example embodiment, the rotation of the driveshaft 430 is used to drive and time rotation of the plates 250*a*/250*b*. FIGS. 8A, 8B, and 8C illustrate a gear case 400 according to an example embodiment. FIG. 8A is a top view of the gear case 400, and FIG. 8B is a cross-section taken along the line C-C in FIG. 8A. FIG. 8C is a perspective view of the gear case 400.

According to an example embodiment, a chain and sprocket 410 may be used to transfer a rotating motion of a crankshaft to a set of miter gears 420, which may change the axis of rotation to one that is perpendicular or nearly perpendicular to an axis of the crankshaft.

The plates 250*a*/250*b* may be made to turn at half the crankshaft speed to provide a proper port timing.

A rotating speed of the crankshaft may be reduced to half by a gear ratio of sprockets, e.g. sprocket 410, mounted on a crankshaft and an input shaft 412 driving a set of miter gears 420. There may be a device to adjust the tension of the chain.

The miter gear ratio may be 1 to 1. A rotor drive shaft 430 may rotate perpendicular to or nearly perpendicular to the cylinder 50. The rotor drive shaft 430 may have a toothed pulley 440 mounted on it. A key 442 and keyway may be used to prevent rotation of the pulley 440 with respect to the rotor drive shaft 430. Alternately, a spline (not shown) or other method may be used to prevent the pulley 440 from rotating with respect to the rotor drive shaft 430. The toothed timing belt 441 may be used to time and drive the pulleys 340*a* and 340*b* connected to the rotating plates 250*a* and 250*b*.

Alternately, the miter gears 420 may be driven by the crankshaft directly and may have a ratio that reduces a rotation of the rotor driveshaft 430 to half that of the crankshaft. Alternately, the rotor drive shaft 430 may have miter gears 420 driven directly off the crankshaft and turning at the same speed as the crankshaft, and one or more pulleys and the timing belt 441, or other suitable method, may be used reduce the plates 250*a* and 250*b* at half of the crankshaft speed.

Alternately, plates 250*a* and 250*b* may be timed and driven by a chain or chains and sprockets (not shown) fastened to the plates 250*a* and 250*b*

It should be understood that many combinations of gear ratios and drive methods could be used to rotate and time a plate at half the crankshaft speed.

Engine performance is dependent, in part, on the timing of events, such as the opening and closing of the ports 220*a* and 220*b* by the openings 260*a* and 260*b* in the plates 250*a* and 250*b*. Optimum timing varies with engine rpm.

According to an aspect of an example embodiment, a belt tensioner, comprising two idler pulleys, adjustable arms, and adjusting mechanism, may be used to adjust the tension in the timing belt 441 (see FIGS. 7A and 7B).

Figure 9A:
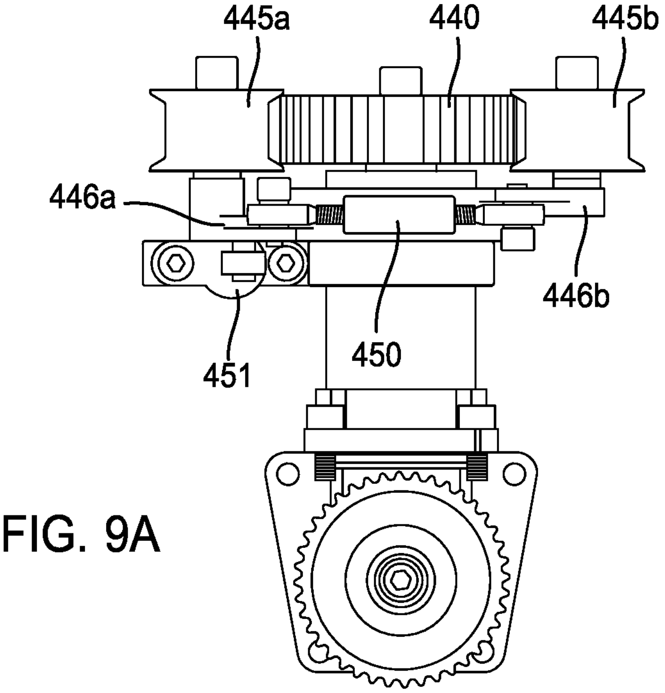
FIG. 9A is across-section and FIGS. 9B and 9C are perspective views of a variable timing unit according to an example embodiment.
Figure 9B:
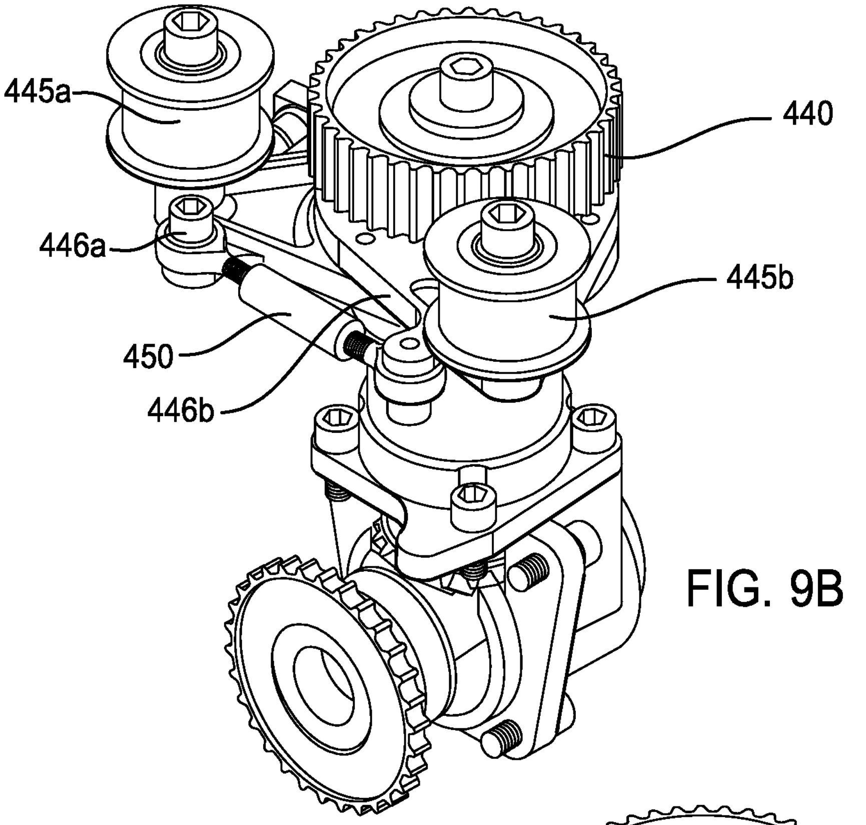
Figure 9C:
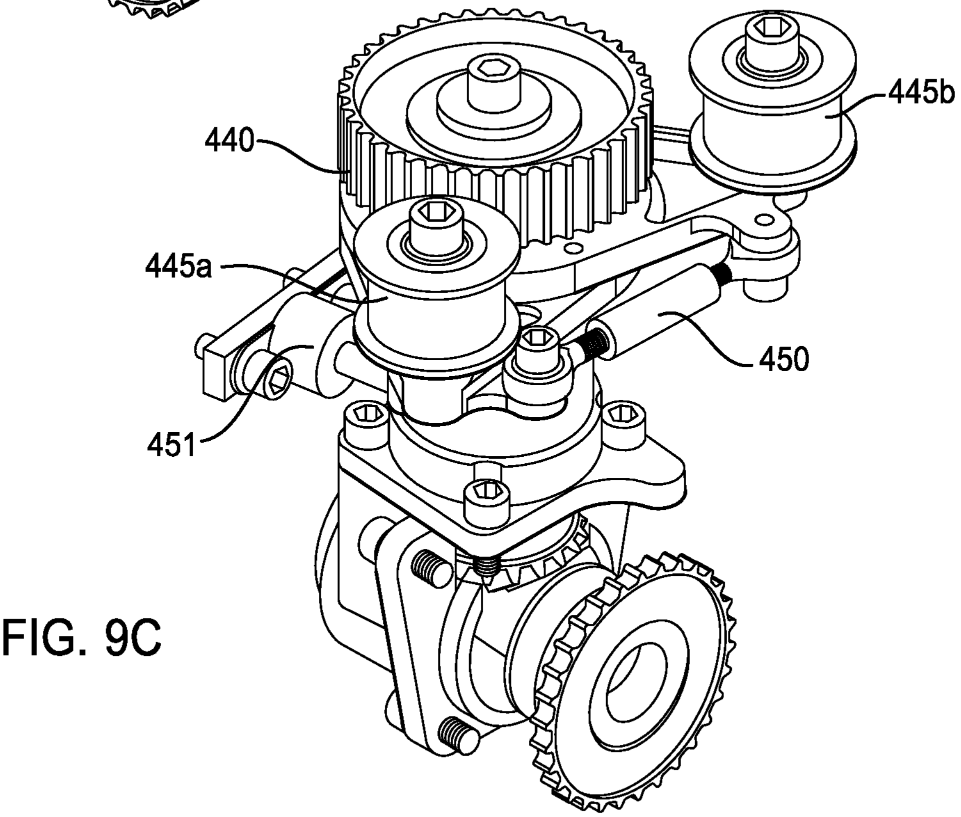

FIGS. 9A, 9B, and 9C illustrate a variable timing unit according to an example embodiment. FIG. 9A illustrates a cross-section of the variable timing unit, and FIGS. 9B and 9C illustrate different perspective views of the variable timing unit. For each of the pulleys 340*a* and 340*b*, a corresponding idler pulley 445*a*/445*b* may be mounted on an arm 446*a*/446*b* that rotates on an axis. An idler pulley 445*a*/445*b* may rotate on bearings, on an axis parallel to the axis on which the corresponding arm rotates. The two arms may rotate on a same axis and each arm 446*a*/446*b* may be attached to an idler pulley 445*a*/445*b* mounted a same distance from the axis on which the arm 446*a*/446*b* rotate. An angle of the arms 446*a* and 446*b*, in relation to each other, may be adjusted by an adjustable length rod 450. The axis on which the arms 446*a* and 446*b* rotate may be the same as that of one of the pulleys 340*a* and 340*b* or that of the rotor drive pulley 440. The arms 446*a* and 446*b* may be mounted so that the pulleys 445*a* and 445*b* contact an outside of the belt 441 (see FIGS. 7A and 7B), such that when the angle between the arms 446*a* and 446*b* is decreased, the belt tension is increased.

When the belt tension is correct, the angle between the arms 446*a* and 446*b* may be locked. This locked adjuster, along with the idler pulleys 445*a* and 445*b* and arms 446*a* and 446*b*, thus function as a variable timing unit that may rotate on the same axis as one of the pulleys 440, 340*a* and 340*b*. Rotation of the variable timing unit increases deflection of one leg of the belt 441 while decreasing deflection of an opposing leg of the belt 441. The relation of the pulley 440, 340*a*, or 340*b*, sharing the axis with the variable timing unit, to the other pulleys 440, 340*a*, and 340*b* is advanced or retarded depending on the direction of movement.

The variable timing unit may be rotated by an adjustable rod fastened to a variable timing unit and a fixed mount and adjusted manually.

According to an aspect of an example embodiment, the variable timing unit may be held by a spring (not shown) in an advanced or retarded position. As engine rpm increases, centrifugal force on rotating weights may be used to move the variable timing unit against a spring to advance or retard the position of the pulley 440, 340*a*, or 340*b*, sharing the axis of the variable timing unit, compared to the other pulleys 440, 340*a*, or 340*b*, driven by the same belt 441.

Yet another example of a variable timing unit control may use an electromagnetic actuator, controlled by the engine control unit (ECU), to accurately advance or retard the timing of the valve events for a particular rpm.

The head 200 may be mounted to the end of the 50 cylinder, to form the combustion chamber 55, and may be held in place by head bolts. The interface between the head 200 and cylinder 50 may be sealed by a head gasket.

The cylinder 50, head 200, rotor cover 251, and plates 250*a* and 250*b* may be cooled by liquid coolant being pumped through them by an engine-driven pump (not shown).

Coolant may circulate through cooling passages (not shown) that surround the wall of the bore of the cylinder 50. A head gasket may have holes therein that allow communication among cooling passages that surround the wall of the bore of the cylinder 50 and cooling passages in and/or surrounding the head and or portions of the head 200.

The shafts 255*a* and 255*b* may each have a shaft 255*a*/255*b*, containing a cooling passage 256*a*/256*b*. The cooling passage 256*a*/256*b* may be in communication, at one end, with the cooling passages in the cylinder, and also in communication with a passage (not shown) that may return the coolant to a cooling radiator.

A rotor cover 251 may contain cooling passages therein that are in communication with cooling passages in and/or surrounding the head and/or portions of the head at one end and also in communication with a passage that may return the coolant to a cooling radiator.

It should be understood that any means may be used to supply and circulate coolant through coolant passages in and/or around the head, rotor covers, and rotors. Coolant may, but does not have to, pass through the cylinder first.

A head gasket may have a hole that allows communication between a pressurized oil supply passage, in the cylinder 50, and an oil passage in the head 200. An oil passage in the head 200 may supply oil under pressure to bearings in the head 200.

There may be more than one intake and more than one exhaust rotor plates.

A one-way reed valve may be installed in the intake port to prevent gases from the combustion chamber 55 from reentering the intake port 220*a*, in the event that pressure in the cylinder 50 is greater than pressure in the intake port 220*a*, before the rotor plate closes.

It may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. An engine head, comprising:

an attachment portion configured to be attached to an end of a cylinder, such that a combustion chamber is defined by walls of the cylinder and the attachment portion;

an intake port and an exhaust port, each in communication with the combustion chamber;

an intake rotor system comprising:

a first plate comprising an opening therein, and a first shaft fixed to and rotatable with the first plate, wherein the intake rotor system is rotatable between a first closed position, in which the first plate closes the intake port, and a first open position in which the opening in the first plate allows passage of gas through the intake port; and an exhaust rotor system comprising:

a second plate comprising an opening therein, and a second shaft fixed to and rotatable with the second plate, wherein the exhaust rotor system is rotatable between a second closed position, in which the second plate closes the exhaust port, and a second open position in which the opening in the second plate allows passage of gas through the exhaust port, and wherein each of the first plate and the second plate comprise an aluminum body and an electroplating layer disposed on a lower surface of the aluminum body, wherein the electroplating layer comprises a nickel and silicon carbide plating.

2. The engine head according to claim 1, further comprising:

a first sealing device sealing between the first plate and the combustion chamber; and a second sealing device sealing between the second plate and the combustion chamber.

3. The engine head according to claim 2, further comprising:

a first bearing configured to support the first plate against a pressure in the combustion chamber; and a second bearing configured to support the second plate against a pressure in the combustion chamber.

4. The engine head according to claim 3, wherein each of the first bearing and the second bearing comprises at least one of a ball bearing, a roller bearing, and a bearing surface.

5. The engine head according to claim 3, further comprising:

a first counterbore configured to receive the first plate, wherein the first bearing is disposed within the first counterbore such that the first shaft rotates on the first bearing;

a second counterbore configured to receive the second plate, wherein the second bearing is disposed within the second counterbore, such that the second shaft rotates on the second bearing.

6. The engine head according to claim 2, wherein the first sealing device seals between the lower surface of the first plate and the combustion chamber, and the second sealing device seals between the lower surface of the second plate and the combustion chamber.

7. An engine head, comprising:

an attachment portion configured to be attached to an end of a cylinder, such that a combustion chamber is defined by walls of the cylinder and the attachment portion;

an intake port and an exhaust port, each in communication with the combustion chamber;

a first plate comprising an opening therein, wherein the first plate is moveable between a first closed position, in which the first plate closes the intake port, and a first open position in which the opening in the first plate allows passage of gas through the intake port;

a first sealing device sealing between the first plate and the combustion chamber, the first sealing device comprising a first compression ring disposed in a first ring groove surrounding the intake port;

a second plate comprising an opening therein, wherein the second plate is moveable between a second closed position, in which the second plate closes the exhaust port, and a second open position in which the opening in the second plate allows passage of gas through the exhaust port; and a second sealing device sealing between the second plate and the combustion chamber, the second sealing device comprising a second compression ring disposed in a second ring groove surrounding the exhaust port.

8. The engine head according to claim 7, further comprising:

a timing belt configured to drive the first shaft and the second shaft.

9. The engine head according to claim 7, wherein:

the first plate is slidable between the first closed position and the first open position;

the second plate is slidable between the second closed position and the second open position.

10. The engine head according to claim 9, further comprising:

a first sealing device providing a seal between the first plate and the intake port;

a second sealing device providing a seal between the second plate and the exhaust port.

11. The engine head according to claim 10, wherein:

the first sealing device comprises a first compression ring disposed in a first ring groove surrounding the intake port; and the second sealing device comprises a second compression ring disposed in a second ring groove surrounding the exhaust port.

12. The engine head according to claim 11, wherein:

the first sealing device further comprises a first spring disposed between a bottom of the first ring groove and the first compression ring, thereby applying pressure between the first ring and the first plate; and the second sealing device further comprises a second spring disposed between a bottom of the second ring groove and the second compression ring, thereby applying pressure between the second ring and the second plate.

13. The engine head according to claim 7, further comprising:

a plurality of bearings positioned to support the first plate and the second plate.

14. The engine head according to claim 13, further comprising:

at least one oil passage in the engine head configured to provide oil under pressure to the plurality of bearings.

15. The engine head according to claim 13, wherein each of the plurality of bearings comprises at least one of a ball bearing, a roller bearing, and a bearing surface.

16. The engine head according to claim 7, further comprising:

a first counterbore configured to receive the first plate, and a first bearing disposed within the first counterbore such that the first plate is moveable over the first bearing;

a second counterbore configured to receive the second plate, and a second bearing disposed within the second counterbore such that the second plate is moveable over the second bearing.

17. An engine head, comprising:

an attachment portion configured to be attached to an end of a cylinder, such that a combustion chamber is defined by walls of the cylinder and the attachment portion;

an intake port and an exhaust port, each in communication with the combustion chamber;

an intake rotor system comprising:

a first plate comprising an opening therein, and a first shaft fixed to and rotatable with the first plate, wherein the intake rotor system is rotatable between a first closed position, in which the first plate closes the intake port, and a first open position in which the opening in the first plate allows passage of gas through the intake port;

an exhaust rotor system comprising:

a second plate comprising an opening therein, and a second shaft fixed to and rotatable with the second plate, wherein the exhaust rotor system is rotatable between a second closed position, in which the second plate closes the exhaust port, and a second open position in which the opening in the second plate allows passage of gas through the exhaust port;

wherein the first shaft comprises a passage formed therethrough configured to enable a liquid coolant to be in contact with the first plate; and wherein the second shaft comprises a passage formed therethrough configured to enable a liquid coolant to be in contact with the second plate.

18. The engine head according to claim 17, further comprising:

a first sealing device sealing between the first plate and the combustion chamber; and a second sealing device sealing between the second plate and the combustion chamber.

19. The engine head according to claim 18, further comprising:

a first bearing configured to support the first plate against a pressure in the combustion chamber; and a second bearing configured to support the second plate against a pressure in the combustion chamber.

20. The engine head according to claim 19, wherein each of the first bearing and the second bearing comprises at least one of a ball bearing, a roller bearing, and a bearing surface.

21. The engine head according to claim 19, further comprising:

a first counterbore configured to receive the first plate, wherein the first bearing is disposed within the first counterbore such that the first shaft rotates on the first bearing;

a second counterbore configured to receive the second plate, wherein the second bearing is disposed within the second counterbore, such that the second shaft rotates on the second bearing.

22. The engine head according to claim 17, further comprising:

a timing belt configured to drive the first shaft and the second shaft.

* * * * *